United States Patent
Heitman et al.

(10) Patent No.: US 10,346,444 B1
(45) Date of Patent: Jul. 9, 2019

(54) MANAGEMENT OF STANDARDIZED ORGANIZATIONAL DATA

(75) Inventors: William F. Heitman, Sugar Land, TX (US); Philip S. Spencer, Butler, PA (US)

(73) Assignee: OpsDog, Inc., Houston, TX (US)

( * ) Notice: Subject to any disclaimer, the term of this patent is extended or adjusted under 35 U.S.C. 154(b) by 285 days.

(21) Appl. No.: 13/348,857

(22) Filed: Jan. 12, 2012

(51) Int. Cl.
*G06F 16/28* (2019.01)
*G06F 16/21* (2019.01)

(52) U.S. Cl.
CPC .......... *G06F 16/289* (2019.01); *G06F 16/211* (2019.01)

(58) Field of Classification Search
CPC .......... G06F 17/30867; G06F 17/3087; G06F 16/211; G06F 16/289
USPC ......................................................... 707/732
See application file for complete search history.

(56) References Cited

U.S. PATENT DOCUMENTS

| | | | |
|---|---|---|---|
| 2005/0075930 A1 | 4/2005 | Hussain et al. | |
| 2005/0149552 A1* | 7/2005 | Chan et al. | 707/102 |
| 2006/0203991 A1 | 9/2006 | Kramer et al. | |
| 2006/0235873 A1* | 10/2006 | Thomas | 707/102 |
| 2007/0016514 A1* | 1/2007 | Al-Abdulqader et al. | 705/37 |
| 2007/0038594 A1 | 2/2007 | Goodwin et al. | |
| 2008/0215731 A1* | 9/2008 | Redd et al. | 709/225 |
| 2009/0157463 A1 | 6/2009 | Morinville | |
| 2009/0182569 A1 | 7/2009 | Morinville | |
| 2009/0210296 A1 | 8/2009 | Goolden | |
| 2009/0222298 A1 | 9/2009 | Atmaja | |
| 2009/0300711 A1* | 12/2009 | Tokutani et al. | 726/1 |
| 2010/0010836 A1 | 1/2010 | Rosen et al. | |
| 2010/0011098 A1* | 1/2010 | Sanborn et al. | 709/223 |
| 2010/0161728 A1* | 6/2010 | Drozt et al. | 709/204 |
| 2010/0306036 A1 | 12/2010 | Gillam et al. | |
| 2011/0077989 A1 | 3/2011 | Akred et al. | |
| 2011/0131082 A1 | 6/2011 | Manser et al. | |
| 2011/0161827 A1* | 6/2011 | Dedis et al. | 715/738 |
| 2012/0030202 A1* | 2/2012 | B'Far et al. | 707/737 |
| 2012/0271775 A1* | 10/2012 | Bell et al. | 705/321 |
| 2013/0031145 A1* | 1/2013 | Luo et al. | 707/812 |
| 2013/0151315 A1* | 6/2013 | Akinola | G06Q 10/06 705/7.36 |

* cited by examiner

*Primary Examiner* — Cam Y T Truong
(74) *Attorney, Agent, or Firm* — Fish & Richardson P.C.

(57) ABSTRACT

A computer-implemented method involves receiving, from a first user, first parameters that describe an organization-specific object for an organization corresponding to the user; mapping the organization-specific object to a standardized organizational object that represents a hypothetical version of one or more actual organizational objects by matching the first parameters to a template for the standardized object; receiving a request for information from a second user of the hosted computer service, the request including second parameters; using the second parameters to map the request to the standardized object; and providing, for review by the second user, information about the standardized object, using the first parameters and stored information about the standardized object.

19 Claims, 10 Drawing Sheets

|  | Same Organization | Different Organization | 3rd Parties |
|---|---|---|---|
| (I) Org-based Mgmt/Input Methods/ Techniques<br>- Search/Retrieve<br>- Comparison<br>- Improve [Benchmark/ Best Practice] | • Training<br>• Managing<br>• Scheduling<br>• Standardizing<br>• Measuring | • Purchasing<br>• Delivery<br>• Joint Product Development<br>• Forecasting | • Seek Jobs<br>• Regulate Better (Governments, etc)<br>• Invest Better<br>• Develop Software<br>• Self or Exchange:<br>  - Software (apps)<br>  - Improvements<br>  - Benchmarks<br>  - Best Practices |
| (II) Community | • Internal Recruiting<br>• Individual Performance Eval.<br>• Collaboration | • Vendor/Supplier<br>  - Recruiting<br>  - Communication<br>  - Transactions |  |
| (III) Applications | • Existing App Consistency<br>• Inventory & Manage Exist<br>• Develop New Proprietary Apps | • Connect with Preferred<br>  - Suppliers<br>  - Customers<br>• Develop Standards for Interoperability (APIs) |  |

MANAGEMENT OF STANDARDIZED ORGANIZATIONAL DATA

TECHNICAL FIELD

This document relates to mechanisms by which people and other objects within a business or similar organization can be positioned in a meaningful manner, typically using a hypothetical standardized organization for an industry, and to techniques for providing information to, or about, such people and other objects when they are so positioned.

BACKGROUND

Hosted computing services that are accessible over the internet may provide computer users with a wide variety of functionality, such as web search, maps, e-mail applications, and the like. These centralized services, whether delivered via a web browser or stand-alone application (or app) at a client device, are powerful because they can extend functionality across many different geographically-dispersed users, and can obtain large amounts of information about various aspects of the users and employ such information to provide functionality that would not be available on systems that operate, for example, within a single corporate organization. Certain of these advantages are achieved through what is known as "network effects."

Various uses can be made of such networked services. For example, people use social networks to identify and communicate with people who have similar interests. Employees may use search engines to find information that is relevant to the conduct of their particular job. Others may use job search services to find job opportunities that are posted for them, or managers may try to determine if they are offering competitive salaries and benefits. Moreover, various users may seek general content, such as information to help them in doing their day-to-day jobs. And competitive intelligence professionals may search many locations in order to get information about competitive companies (including information relating to specific improvements), such as to benchmark their own company against those other companies and then improve their company accordingly. In addition, where high levels of standardization can be achieved, automation and outsourcing of activities or processes may be achieved.

Such uses generally involve making comparisons between two objects, whether those objects are people, organizations, positions within an organization, work output or product, or processes or tasks to be performed within an organization. The comparisons may be difficult to make or inaccurate because organizations have many different forms, so that one organization does not map well onto another, and vice-versa. Also, even where there might be an accurate mapping, such mapping can be difficult and additional problems of comparison can emerge because different organizations may provide different labels to the same object, such as by providing different job titles to positions that do the same sort of work.

SUMMARY

This document discusses systems and techniques by which organizational information for various users—e.g., information that reflects their job title or other position within a formal organization such as a corporation, partnership, or non-profit (or other organizational characteristics such as size, location, and work activity)—may be used to service those user or other users, including individuals or organizations trying to interact with the system or with other users of the system. In general, the techniques discussed here involve normalizing information from two different organizations so that the data from both organizations matches a standardized organization or hierarchy. For example, employees within different organizations may be slotted into standardized roles that have characteristics that match the characteristics for the particular employees (with the characteristics including, e.g., the tasks performed by the employees, the number of staff who work under them, the amount of budget they control, quantity of work output, and the like). Alternatively, processes may be matched to standardized processes, e.g., to determine whether the amount of time or money that one organization spends on certain steps of a process are comparable to that spent by other organizations; whether the steps comply with legal and regulatory guidelines and requirements; and how various shareholders assign value to companies that have different organizations and processes. Other such useful comparisons and determinations may also be made with normalized organizational information.

Many of the examples discussed here involve determining a standardized working role for each user so that comparisons and associations between users may be employed. Such standardizing of roles may be necessary because every organization selects a unique organizational structure and unique titles for workers, activities, process, and work products within the structure. For example, one organization may refer to someone as being a Director of Customer Support, while another might refer to the same position as Vice-President of Service. Also, while both jobs may be comparable to each other, each organization may place them in different locations in an organizational hierarchy (which is typically represented by an organizational, or org, chart).

Such comparisons may occur in at least three types of main scenarios. First, comparisons may be made between different parts of a single organization, such as different departments in the same company, or similar types of sub-groups within divisions of a large company (e.g., purchasing departments). Comparisons may also be made between different organizations, such as by comparing individuals having comparable roles at two different companies, departments having comparable duties and characteristics, and tasks or processes having comparable inputs, goals, and outputs—where standardization may be used to identify a baseline for such objects and the comparability of the two objects across organizations. Third, comparisons may be made between two different third-parties.

The systems and techniques described here may, in certain implementations, provide one or more advantages. For example, employees with a single organization may use such techniques to improve their efficiency, and internal consistency and standardization. Moreover, employees in different organizations that have very different organizational structures or different job titles, may be associated with each other, such as via a standardized job title for the industry in which the employees work, and may be placed at a common position on a standardized organizational chart. Such association may then be used to provide services to the employees, such as career advice, job placement assistance for a next standardized position up the corporate ladder, social connections with others at similar positions within the industry or in other industries, and similar services.

Third parties may also take advantage of the standardized associations that a system may make, such as by employers listing job openings and being presented with job seekers whose standardized working roles place them at a level appropriate for the job openings. Also, individuals at employers may access information directed to their particular position within an organization, such as best practices materials, work flows, white papers, and other relevant content. Moreover, such techniques may be used to build a qualitative research platform, to support, for example, usability testing and the creation of standardized focus groups (e.g., by finding members for a group from those who match a particular standardized role and inviting them to be part of a focus group). Also, advertisers and salespeople can use information using the techniques described above and below target an audience for advertisements (e.g., they may identify a standardized role to which their advertisement is directed, and the advertisement may then be selected for presentation when a user of the system who matches that standardized role log into the system). In addition, software developers can study such standardized data to improve their applications, such as by writing applications that define particular organizational roles that matched the standardized roles, and are thus more likely to match particular organizations better. And outsourcing suppliers may use such information to standardize, improve, and expand their offerings.

The details of one or more embodiments are set forth in the accompanying drawings and the description below. Other features and advantages will be apparent from the description and drawings, and from the claims.

DESCRIPTION OF DRAWINGS

FIG. 1C is a table that shows a schedule of services that may be provided to users of a system.

FIG. 5 is a screenshot of an interface that allows user to access information based on organization and industry-based structures.

Like reference symbols in the various drawings indicate like elements.

DETAILED DESCRIPTION

Figure 1A:
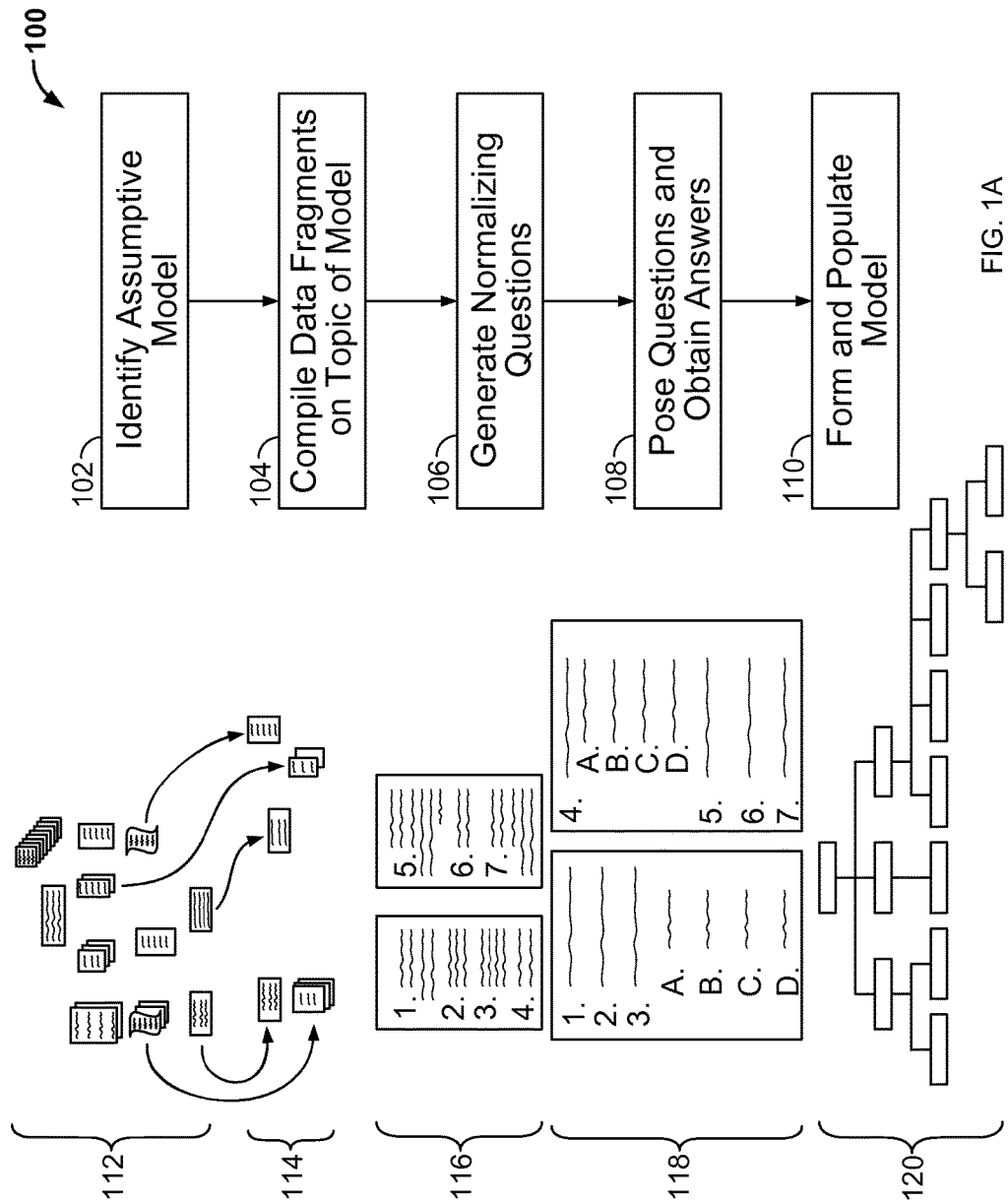
FIG. 1A shows a flow diagram for the creation of standardized organization items.

In this document, systems and techniques are discussed that permit useful actions to be performed using cross-organization data, i.e., data that describes characteristics of a first company such as tasks performed by certain employees of a company, and similar characteristics of a second company. The techniques involve first normalizing into a common format the data as it is kept for each of the organizations. A normalization process may begin with a hypothesized template that a knowledgeable worker may create to reflect what they believe to be a unifying way in which to describe the information for multiple organizations. That template may then be presented to various organizations, which may complete the template using information from their particular organizations. The template may then be updated based on the received input, and the updated template may be used in further iterations. At the same time, the information provided by each organization may be used to map objects within their organizational structure to the normalized structure.

With information from different organizations mapped, or reduced, to a normalized structure, various useful comparisons and other operations may be performed on the data. For example, a member of one organization may identify their position and various data that is associated with a normalized position to which their position corresponds may be provided and analyzed. For example, the employee may identify various metrics for the position, such as average pay and benefits, average hours worked and level of travel, number of other employees supervised and the like. In addition, other measures may be identified such as productivity measures, work product, or customer service levels that an employee or group (e.g., department) delivers. The employee, or a different member of the organization like a member of a human resources department, may use such information to benchmark their position against corresponding positions at other companies. In other examples, external users such as existing or prospective shareholders in a company may compare normalized, estimated information for particular companies against each other or against a norm. Other uses that may be made of such comparisons are described in more detail below.

The cross-organizational data may take a variety of forms, and may be considered in the form of an intersection between particular components within an organization, and parameters for measuring those components. The components may include, for example, job positions, organizational areas or groups, business processes, business groups, and enterprises (which each include multiple business groups). The parameters for each such component may be considered as structural parameters and performance parameters. The structural parameters include, e.g., scope and definition for the component, location, size, title/label, and other such parameters. The performance parameters include duration or quantity, output or product produced, errors or waste, cost, and the like.

FIG. 1A shows a flow diagram for the creation of standardized organization items. As shown, a process 100 indicates operations that a system may perform using computer-automated and/or manual processing, in order to develop a normalized representation of an organization object, such as an organizational chart or other objects. The process can be repeated across various different industries to create normalized representations for those particular industries, and can be repeated for different organizational objects, though the particular steps will vary for different types of organizational objects that are to be normalized.

In general, the figure shows a flow chart to the right, and corresponding operations on real-world objects to the left, in order to tie the sometimes-abstract process to actual operations that are performed in a certain example. The process begins at box 102, where an assumptive model is identified for a particular organizational object. The model may involve a hypothesized descriptive template for the object or objects, such as parameters regarding organizational size, structure, job descriptions, workflows, work product or output, and the like. As shown by stage 112, the model may be generated by a trained person reviewing a number of data fragments, such as articles and white papers on an industry, annual reports, and other such information. The user may then select particular fragments and organize that selected content at stage 114, as indicated in the process by box 104, and may incorporate their own personal knowledge and experience. For example, the user may identify articles of a certain common type (e.g., annual reports) about an industry for which the user is trying to create an assumptive model, and may group particular common portions of the annual reports (e.g., descriptions of corporate hierarchical organization.

At box 106, and as indicated at stage 116, the user may generate normalizing questions, which are questions designed to gather data in the particular area and a test other characteristics relating to the organization. For example, the questions may relate to the size of certain departments in an organization, the names of positions that a person at another position reports to or supervises, steps in a workflow performed by a part of the organization, related technology or automation requirements, resisting or prospective outsourcing services, common work activities, standard responsibilities, and other similar questions that are discussed in more detail below. The user may develop questionnaires after attempting to identify which parameters about the particular object will be important to members of various organizations, and may offer the questions so as to obtain information about those parameters.

At box 108 and stage 118, the questions are posed to members of various different organizations, and answers to the questions are obtained from those people. For example, such members of organizations may log onto an Internet website, provide basic information about themselves such as the industry or sub-industry in which they work, the type of department in which they work, and a description of their job in that department. The computerized system may then select a previously-created questionnaire to present to such a user, and the user may answer the questions in the questionnaire according to values for the presented parameters in the questionnaire that match the user's organization. For example, a user may respond to a question about the size of their department by typing the number of workers in their department. The user may answer a question about workflows by being presented with a number of graphical objects that represent possible steps in a workflow, and arranging the objects into an order, to indicate how the workflow is performed in their particular organization. A user may select from a list of titles for their supervisor or people working under them also, or may type a title or commonly-performed work activities for such people, to give the system an indication of where the user fits within an organizational hierarchy.

Such a process of obtaining answers to the questionnaire may repeat be repeated for multiple users who log into the system, and may be compiled and combined in various manners. For example, clustering analysis may be performed on the answers to identify common answers that have been provided by particular users. For example, if multiple respondents have similar job descriptions and all report directly to the CIO, an inference may be made that, in a graph that describes a standardized organization chart for that industry, an edge should be placed between a standardized representation of the job title for the users who answered the survey, and a standardized job title for the superior (which may be CIO). The system may also check to determine whether the standardized job title should be changed or merged with a separate standardized title for other users who report to a CIO Similarly, other connections between standardized roles can also be made based on answers that other workers have provided to the same or similar questionnaires. In time, then, when a sufficiently high frequency of respondents have provided similar answers, a revised version of the connections in the organizational chart, may begin to form and be inferred from the answers.

Thus, for this particular example, as shown in box 110, an actual model may be formed and populated to augment or replace the assumptive model. For example, as shown at stage 120, an organizational chart can be formed that may have the same standard general form as the assumptive organizational chart, but that has been altered, where respondents have identified relationships different than those in the assumptive model or added more detail and variation to the model. As shown by the arrow back to box 106, the model may continue to change over time as additional respondents provide answers to the normalizing questions, and manual intervention in the process may also be used to confirm that the automatic connections and modifications made by the system are consistent with common sense.

Various mechanisms may be used for making such automatic connections and inferences based on answers provided by the respondents to the surveys or questionnaires. For example, as noted above, clustering analysis may be performed to find answers that are similar to each other. Also, machine learning approaches of various known forms may be used, by providing an initial set of training data for establishing expert rules, and by applying such rules to future input in order to generate assumptions and connections for a model. Other similar approaches and algorithms may also be used for reducing a number of different responses to a normalized model of an organization, a process, or other object relating to the organization.

For example, a work process or activity that was previously missing from a list of standardized activities or processes for an industry may be added to the list if it is performed by greater than a predetermined share (e.g., 50%) of users who correspond to a particular standardized working role. Also, organizations can be connected to each other or grouped based on their total employee headcount, total annual revenue in the industry or region, and other similar factors. In addition, an automated process may be used to eliminate particular roles that were previously listed as standardized roles if they are found to be redundant with other standardized roles or otherwise need to be merged into other standardized roles (e.g., if the process determines that very few people match the to-be-merged role, and that the description of the to-be-merged role closely matches that of a role that many more people are identified as occupying). By similar mechanisms, a system may add or merge work roles, processes, or activities within a certain organization or industry.

By this process, then, a group may initially seed a system for making comparisons between organizations, by generating basic models, and then may use answers to questionnaires to further refine and fill in the models. These models may represent a standardized or average representation of an organization or part of an organization in a particular industry. The standardized representation may be generated in a relatively simple manner by taking advantage of users who want to obtain information from the system and are thus willing to answer questionnaires, and by automated analysis of those answers. The representation of the particular organizational object may be kept up-to-date by continually obtaining additional information from additional users to answer the questionnaires so as to provide relevant information about their organizations. As a result, a highly accurate model of an organizational object may be generated with benefits to multiple parties.

Figure 1B:
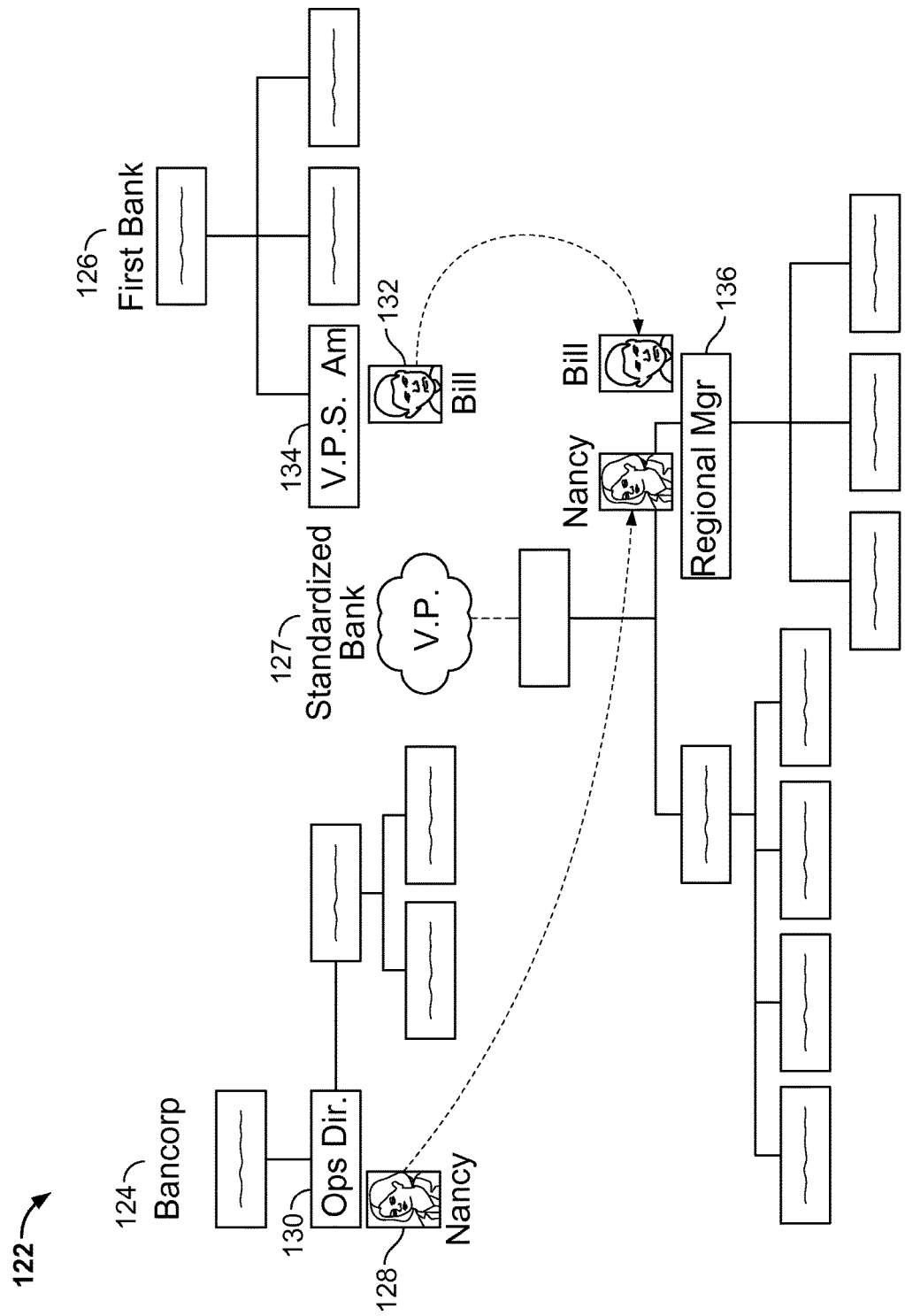
FIG. 1B is a conceptual diagram that shows placement of individuals into roles in a standardized organization chart.

FIG. 1B is a conceptual diagram that shows placement of individuals into roles in a standardized organization chart. In general, the process for placing individuals in this example may occur after a standardized organizational chart has been generated using techniques like those discussed above, in response to input received by a user who is registered with the system.

In this example, an organizational chart for a first bank named Bancorp 124 is shown to the left, and the portion of an organizational chart for another bank called First Bank 126 is shown to the right. An employee named Nancy 128 works for Bancorp 124, and her title is operations director as indicated by box 130. Similarly, an employee named Bill 132 works for First Bank 126 as a V.P. for South America, as shown by box 134. Each such user appears to have a completely different job or role at their respective company, if one were to look solely at their titles. However, as shown by the standardized bank chart 127, Nancy 128 and Bill 132 both correspond to the role of regional manager 136 in a standardized representation of the banking industry organizational chart. Such correspondence may have been identified by a computerized system through a process of asking Bill 132 and Nancy 128 questions such as the type of work that they supervise, the number of people they supervise, the title of the person they report to, the work processes with which they are involved, the activities that they direct or perform, the hard and soft skills they possess, their salary, their work history, their educational background, and other similar questions, so as to determine that, despite their difference in formal titles at their companies, they both have essentially the same role as each other at those companies, and thus should be assigned the same standardized title within the standardized bank chart 127.

In addition to placing them within the standardized chart 127, the system may simultaneously use their answers to further update a model for a standardized bank. For example, if multiple users defined a relationship to their superior at their company, who has a title that differs from the title of the relevant superior in the standardized bank chart 127, the system may provide additional weight to that other title, and may change the title for the position or the supervisor's position in the chart 127 if enough additional users provide that title in a particular spot in the organizational chart.

In similar manners, continuing answers provided by new users can also be used to add new roles into a standardized organizational chart. For example, in recent years, additional employees maybe have begun to identify roles that report to positions relating to diversity, ethics, and environmental management within general organizations, and a system like that discussed here may dynamically adjust to include such roles in a standardized chart 127 (e.g., by moving certain prior roles out of a human resources department and into a separate diversity department whose director reports directly to the CEO).

Thus, as shown in this figure, particular examples of objects are shown that may be mapped, using answers to a normalization form like that discussed in FIG. 1A, into a standardized or normalized organizational representation. Such mapping may then be used in various ways, including ways that are described in more detail in FIG. 2A.

Although not shown here, other objects within an organization may be mapped to a standardized organizational representation in similar manners. For example, an author may submit a white paper to such a system and may be asked a series of questions to identify the type of worker to whom the white paper may be relevant—e.g., "Is the paper related to human resources," "Is the paper related to topics for managers of other workers," "Which set or sub-set of activities, processes, or work product in the paper relate to human resources," etc. Those questions may be used to identify the role of a worker who might benefit from the paper, and a link to such a role may be created in a file that corresponds to the paper, so that when workers identified as corresponding to that standardized role request or search for papers, they are shown the white paper as a result. Alternatively or in addition, a human analyst or group of users of the system could vote and classify articles, sources, and other objects as matching or not matching their particular role, such as by rating such objects on a typical 5-star system where the stars may represent an overall rating or a sub-rating that is directed specifically at the applicability of the object to the particular role.

Similarly, an employer listing a job opening may have previously "qualified" all of its positions by answering questions about them so that they could be mapped to a standardized format, or the employer could answer questions at the time of posting the job opening so that the system can know how and where to categorize the job opening within a standardized organization for the relevant industry, so as to show the opening to other users who may answer similar questions about attributes for the job they are looking for. Using such answers, the system may locate the position to be filled within a standardized organizational chart, and may later show it to jobseekers who answer questions in a manner that indicates their next job is appropriately at the standardized position (even if their experience at their current employer indicates that the position should be different or have a different title).

FIG. 1C is a table that shows a schedule of services that may be provided to users of a system. The system may include systems like those shown in FIGS. 1A and 1B above, and 2A below. In general, connections are shown across the top axis of the table, where connections may be made between users within a single organization, between different organizations (e.g., between individuals within the different organizations, between the organizations themselves, or between an individual and an organization. The left (vertical) axis shows particular categories of objects or items in a system that may have attributes assigned to it, including organization-based items, community-based items, and applications. Each box within the table shows uses and applications that a system may provide for the particular group of items and the particular connection.

Figure 2A:
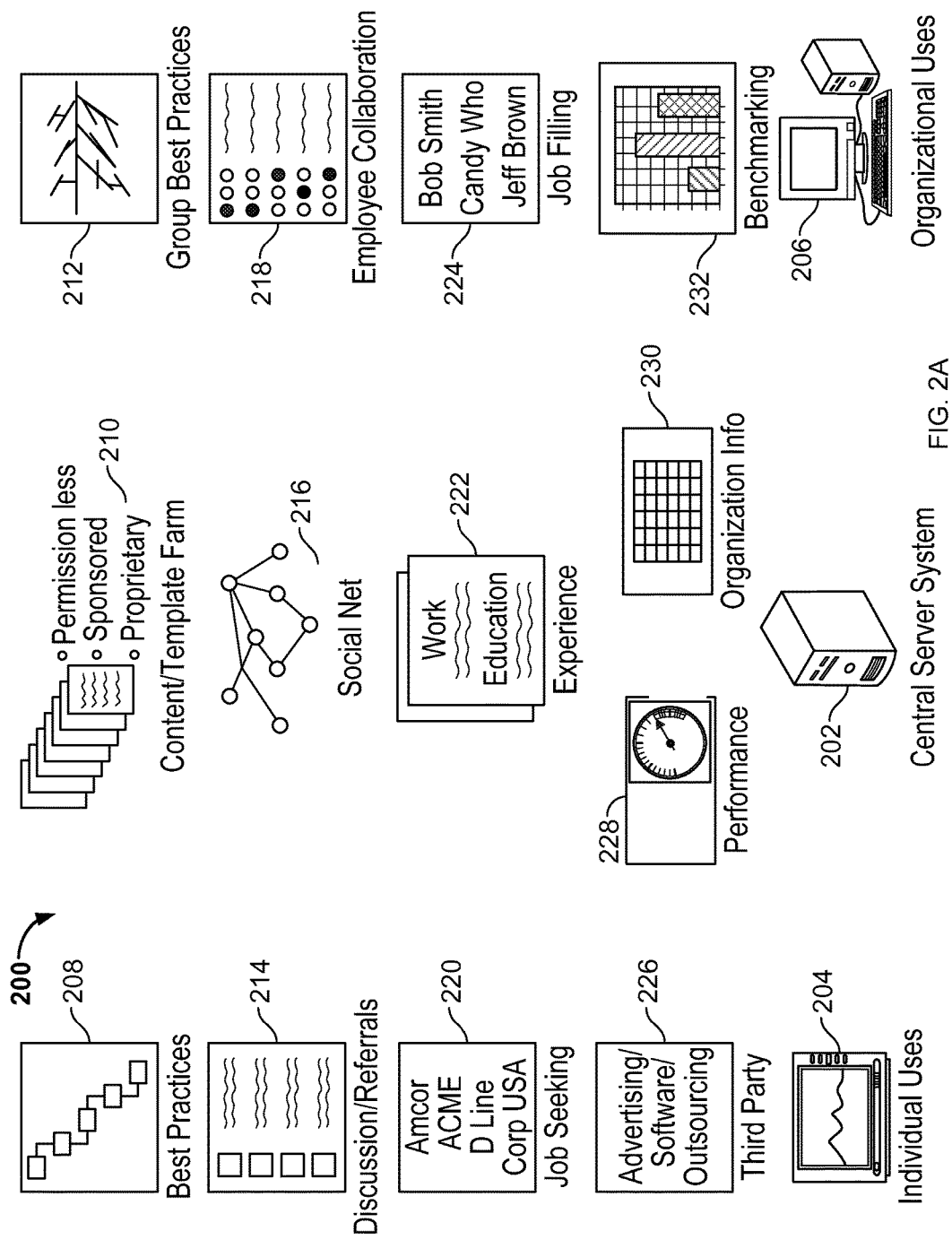
FIG. 2A is a schematic diagram that shows services provided by a hosted system with respect to members of formal organizations.

FIG. 2A is a schematic diagram that shows services provided by a hosted system 200 with respect to members of formal organizations. In general, the system 200 and is shown as a hosted system because it centers around a central server system 202 that receives input from various users, including (a) individual users 204, which may include employees of an organization acting on their own, job seekers, and the like, and (b) organizational users 206, which may include human resource professionals, individuals looking for information with respect to their role at a particular company, and the like. As shown here, the central server system 202 may manage a number of objects, and may present a variety of forms of information to the various users, where the objects are shown vertically above the central server system 202, and the services are shown vertically above the individual users 204, which is indicated by a mobile computing device, and the organizational users 206, which are indicated by a desktop computing device.

For example, the central server system 202 may present the various users with a content or template farm 210, which may include a variety of textual and graphical content and forms that are available to the users. As one example, the content may include white papers and other publications that are written to be reviewed by workers of a particular type, such as people who have similar jobs to each other. The content may also include best practices manuals, checklists, forms, process flow diagrams, and any other content that individuals within an organization may receive benefits from having access to.

A social network 216 may also be maintained by the central server system 202. The social network 216 involves a social graph that connects users, as nodes in the graph, to other users by edges that represent relationships in the graph. Such information may be managed and maintained by the central server system 202 itself, or may be obtained from a third-party service that acts as a more general social network, such as FACEBOOK or LINKED IN.

The data and relationships may be obtained from such a third-party service, such as by users who are members of the central server system 202 providing permission for such access. The social network 216 may thus be used to permit posting of information by users of the system 200 and review of such information by other users that have a relationship to the posting users. The relationships may be direct, one-to-one relationships, such as classic friend or friend-of-friend relationships. The relationships may also be group-based, such as by a user identifying themselves as a member of a particular group, such as a professional group related to their working role. For example, one group may include in-house attorneys who specialize in employment law, and those members may post and be presented with information about meetings, leading legal practices, average industry compensation (and ranges of compensation), standard market data (e.g., number of firms in an industry, average margins, and average headcounts), news feeds and articles, customer service levels, legal education opportunities, questions about particular legal issues, and answers to such questions, from other users in the group. Moreover, the relationships may be from an organization to an individual, an organization to an organization, a group to an organization, and a group to a group. In addition, there may be a group of organizations (e.g., all Texas law firms, New York IT services companies, and the like).

An experience database 222 may also be maintained by the central server system 202. The experience database 222, may include, for example, profiles of various users registered with the system 200. As one example, the information may be similar to information that is provided on a resume, though the particular information may be mapped to standardized organizational representations. Thus, for example, each job that a user has had in their career may be mapped to different positions in standardized organizational charts. Such mapping to a standardized or normalized chart may be used, for example, to map the progression of the user in a career and to determine the next position in the career of the user. Such a determination may be used, for example, to identify job postings that may be relevant for the user that relate to that next position for the user. In addition, such tracking may be used by employers to identify whether the user it has progressed at an appropriate rate in their career, the average rate of progression in a certain industry or working role, and whether they are ready for a particular job that they may be applying for at one of the employers.

A performance database 228 and analyzer can identify the operational performance of units or subunits of organizations with which a particular user was affiliated, so as to identify and benchmark the relative performance of those units and subunits compared to other comparable units or subunits of other organizations or the units or subunits before or after the user was affiliated with them. Such factors may be used to infer the user's management capability or effectiveness. As such, the performance database 228 may represent a historical, cumulative database reflecting performance for individual users, groups of users, organization, etc. The database may then be used to derive a single cumulative score or composite ranking of performance for a user, organization, sub-organization, or group.

An organization information database 230 may also be maintained by the central server system 202, and may represent various parameters regarding objects located in an organization. One such category of objects are roles of employees in an organization, and the information may identify typical salaries, benefits, responsibilities, spans of authority, common work tasks, common job titles, and other such information about a typical worker in each of such roles. The organization information may also include information about particular departments or units of an organization, such as typical sizes of such departments, typical spending by such departments, workflows performed by the departments, connections to other departments that a first department communicates with, and other similar information.

Represented along the left side of the figure are particular applications that individual users 204 may make of the central server system 202 and the services. As just discussed for the system 202. For example, a best practices service 208 may be used to present to an individual user content and other data that indicates best practices for performing certain operations within their zone of authority, according to a standardized role for them in an organization. Next, a discussion and referrals service 214 represent a social service by which a user may have online discussions with other users in the same or similar standardized roles as them, or in a role to which they would like to move. Such a user may ask questions, for example, of other users relating to the type of experiences needed to work in that role, how they enjoy or do not enjoy working in that role, common interview questions from employers, average salary, and other such information.

A job seeking service 220 may be made available to individual users 204, for those users to identify job openings that may have been posted by organizational users 206, or the openings may be mapped to standardized roles in an organization, as may the capabilities of the jobseekers, so as to identified jobs that may be relevant to users even though their particular job descriptions or titles may not match those other jobs for which they are fit.

A social connections service 226 may take advantage of the social network 216 other components in order to allow users of the system 200 to interact with each other in various manners. For example, a group videoconferencing system (or interactive group discussion platform, such as a webinar that all members of a certain group, organization, or working role may join) may be established so that members of an interest group in the social network may set up continuing education sessions or other such sessions for interacting with each other and learning from each other.

A variety of other services may be provided to the organizational users 206. For example, best practices 212 are similar to best practices 208, but relate to the operation of an entire group, rather than to best practices for a particular person at a particular role in an organization. As one example, group best practices may indicate best ways in which to operate an entire division or group within an organization.

Employee collaboration service 218 may be used by various employees within a particular organization to work together on various projects. For example, document sharing and document management services may be provided, as may forms and other information needed by employees within a group. Organizations could also use such a system as a project management and planning platform. The content that is made available may be selected to correspond to a standardized or normalized group within a standardized organization.

A job filling service 224 may correspond to the job seeking service 220 and may provide interaction for human resource or other hiring personnel within a company, in listing job openings and looking for employees. For example, the human resource employee may answer questions about a job that is being offered by their organization, and may post information about the job such as a job description, and the system 200 may locate that job within a standardized organizational chart and present it to other users that it has determined to be appropriate fits for jobs at that standardize position. Such matching may occur by the methods discussed above of asking each user questions about the job they are posting, and the job they are seeking, and mapping both to a common standardized organizational role so that a proper introduction can be made.

A benchmarking service 232 can be provided so that an organizational user 206 can compare objects in their organization to objects in other organizations or to averages across multiple organizations. For example, a human resource employee may answer questions about a position within a company, similar to questions that would be answered in posting a job opening, and may be shown how responsibilities, and other aspects of that position in their company compared aspects in other companies, such as salary, span of authority, benefits, and the like.

Figure 2B:
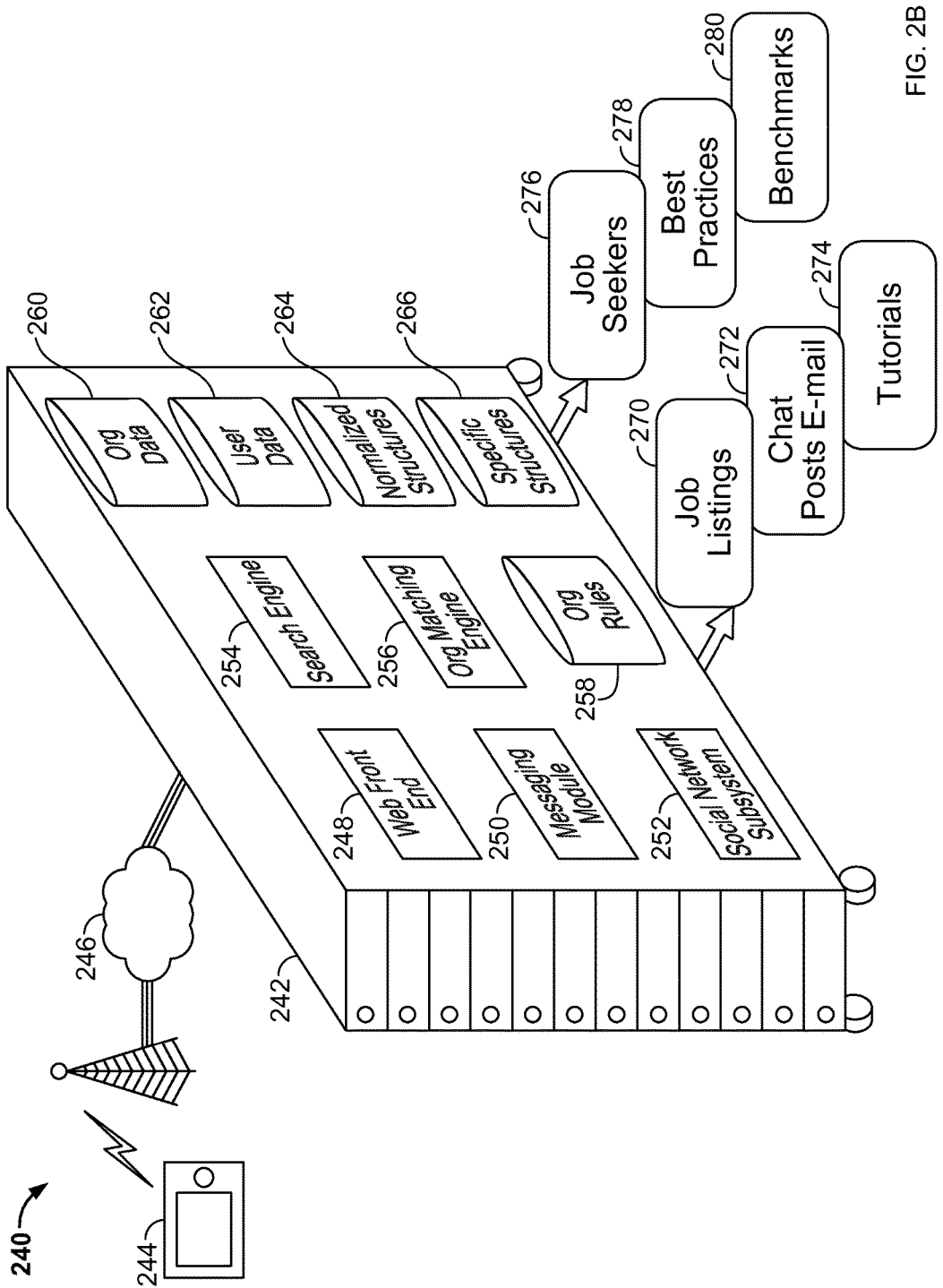
FIG. 2B is schematic diagram of a system for managing role-based information for members of organizations.

FIG. 2B is schematic diagram of a system for managing role-based information for members of organizations. In general, the system 240 is a server-based system like that shown in FIG. 2A, but with particular example components shown in more detail to indicate one technique for implementing these services described for FIG. 2A. In this example, a mobile computing device 244 communicates with a server system 242 through a network 246, such as the Internet. However, other types of computing devices, including laptop computers, tablets, and desktop computers may also be used. Also, although server system 242 is shown as a representation of a single rack server system, multiple different server systems may also be provided, and particular services may be obtained from separate third-party server systems, even though a single server system is pictured here for clarity of explanation. Where multiple separate server systems are used, they may communicate with each other through the network 246 using standard application programming interfaces (APIs) and other known techniques.

Referring now particularly to certain components of the server system 242, the server system 242 includes a web front end 248 may take the form of a standard web server subsystem, and may provide for interaction with various computing devices through network 246. For example, the web front end 248 may receive HTTP requests and similar requests, and may provide responses in various forms, including XML code and HTML code to be rendered on device 244.

A messaging module 250 may be used for generating messages between users of the system 240. The messaging module may take a familiar form and may provide for text messaging, instant messages, and other similar messaging. For example, in an implementation with a social networking service, the messaging module 250 may identify a user who is trying to access a social networking application on the system 242 and may gather various messages and other information posted by users who are identified as acquaintances of the requesting user, so that the requesting user may review such posts in a chronological list.

A social network subsystem 252 may also take a familiar form and may implement a social graph that connects users of the system to each other, and provides various functionality that is traditionally represented in a social networking application (e.g., sharing of posts and other content, chat, videoconferencing with contacts, and the like).

A search engine 254 may also take appropriate form and may provide for searching of various content that is stored on the system 242. For example, users of various services may attempt to search for other users by name or by organizational role (e.g., by similar business process or work activity, and by further refining a search by other attribute such as geography, industry, language, etc.), and the search engine 254 may identify those other users or content on the system that is directed to the role that is being searched. The search engine in this system may be different than a standard search engine, however, in that it may, in addition to matching search text or search concepts, also attempt to correlate an entered search query to a standardized organizational object. For example, if a user enters a query with a particular job title, the title may be mapped to a standardized title, and the standardized title may be submitted as a corrected or expanded query that can generate results that have been previously indexed according to the standardized title.

Also, an organization matching engine 256 may be provided to perform the type of standardization and matching between objects in organizations as described above. For example, the organization matching engine 256 may provide questionnaires to users and may employ their responses to find connections between objects at different organizations that are described or labeled differently from each other, but that share similar attributes. The organization matching engine 256 may also normalize or standardize information entered by various users so that comparisons can be made between those users and other objects that have a correspondence in a standardized organization representation.

Various data stores are shown here for storing and providing data to the other components as appropriate. For example, organizational rules 258 may be accessed by the organization matching engine 256 in order to perform matching and other normalization functions. For example, clustering rules may be used to identify clusters of answers by users so as to determine that a particular organizational role should be added to her and organization chart, among other things.

Other rules may include the identification of groups of activities that are common among large groups (e.g., over 100) of users and analysis of related user information to normalize work roles or titles for those groups of activities; notifying a system administrator when a user user-generated title is submitted more than a predetermined number of times (e.g., 50), and the administrator may perform manual research to normalize the position/title and add it to a standardized hierarchy and shift those prior users to the new standardized role; grouping of users who are determined to perform a predetermined common percentage (e.g., 50-74%) of the same work activities or tasks into a "rough" connection status that is as being assigned to the same standardized role, but may nonetheless be used in manners similar to those for users in the same standardized role though with a lower weighting (e.g., user with the same role may be weighted as 1.0 for matching, where is others may be weighted between 0 and 1.0), where different levels of match may be generated between two different users, between a user and a group, or between a user and a standardized role; matching of items using tags assigned to objects (e.g., white paper, best practice, market summary, or job posting), including by matching a user to an item if their job role or other job-related information relates to more than a predetermined number or percent of the tags that correspond to an item.

Organizational data 260 represents various objects within a business or similar organization. For example, the organizational data may represent content that users of the system 240 may request, may represent best practices and other guides for such users, may represent descriptions of various organizations, from which normalization rules may be inferred, and may include other such information as needed by the system 242.

User data 262 represents information about particular users of the system 242. For example, the user data 262 may include typical information that one might see on a user profile online, such as a username, e-mail address, work history information, relationship status, and the like.

Normalize structures 264 may represent various organizational objects that the system 242 has generated or stored to represent standardized, or normalized, objects in various industries. For example, the normalized structures may include standardized workflows for particular departments in particular industries, and may also include standardized or normalized, organizational charts. Standardized or normalized objects are those that match a hypothetical representation of an aspect of an organization that is intended to be representative of multiple organizations or an ideal for such organizations.

Specific structures 266 may represent organizational charts for particular organizations. For example, through the answering of various questions by a number of employees at a company, the system may, over time, build an organization chart as a graph that connects users along edges, much like a graph for a social network—i.e., when the user identifies their supervisors and reports, they create an edge between their position and the positions of those other people in the graph. The system may also begin to generate specific structures for other organizations as well. Such structures may be compared in order to perform a normalization function and generate a normalized structure. Also, such structures may be used, such as when a new user is added to the system, to identify someone in an organization with which they have an organizational relationship, such as their supervisor or peers (internal or external) with the same or similar working role. The known organizational structure may be used in such a situation to identify the appropriate standardized role for that user, without having to ask particular questions of the user.

A variety of outputs may be generated by the system 242 that may be used by various users of the system 242. Each of these outputs may be generated after associating a request or a user who made a request with a standardized organizational object, and providing content to the user that is associated with or directed to that standardized object, such as a standardized worker role in an organization within a particular industry, a set of leading practices, white papers, benchmarks, performance standards, or policies or regulations (e.g., federal, local or organizational) for the organization or object.

For example, job seekers interaction 276 may be generated in the form of interactive forms that human resources or other hiring employees may be presented with and to which they may provide information if they are hoping to post a job opening. Best practices information 278 is content that members of an organization may review to help them understand the best way to perform certain aspects of their jobs and the like. Similarly, benchmarks 280 may be reports or other content provided to various users that compare their organization or performance of their organization to other organizations and performance. Individuals can also benchmark themselves against other users in a similar working role (e.g., in terms of salary, hours worked per week, benefits received, and performance levels achieved). Thus, benchmarking may be performed on and for individuals, organizations, and sub-organization.

Job listings 270 may be provided to individual users who are looking for a job after they have provided information that indicates a standardized role that their future job would involve. Similarly, chat, posts, and e-mail 272 may be provided, such as by the messaging module 250, to allow users of the system 242 to interact with each other through the system 242. Also, tutorials 274, personal anecdotes, expert advice and guidance, and mentoring, may be provided in a manner similar to best practices 278 and may be made available to individual users so that they may apply the materials and information and better learn how to perform their jobs and improve the manner in which they perform them.

Figure 3A:
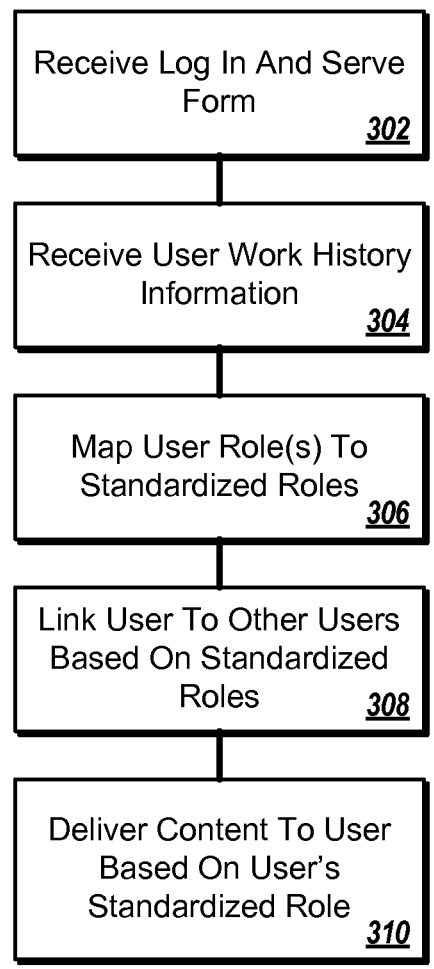
FIG. 3A is a flowchart of a process for associating users with standardized roles and providing information to the users based on the roles.

FIG. 3A is a flowchart of a process for associating users with standardized roles and providing information to the users based on the roles. In general, the process shows steps that may be taken by a new user to a system like the system 200 in FIG. 2A and the system 240 in FIG. 2B.

The process begins at box 302, were a system receives login and serves a form to the user. For example, the user may have previously provided information about themselves and selected a user name and password that may subsequently be used to log into the system. The form that is served may be a form a user has requested when they would like to make themselves available for jobs that have been posted on the system. The form may ask a number of questions of the user, such as questions directed to determining the sort of job for which the user is interested and also qualified. For example, a form may ask for information such as common work activities, job responsibilities, salary, reporting structure, current non-standardized job title, hard skills applied, soft skills applied, etc.

At box 304, the system receives user work history information from the user. For example, the user may fill out a form for each job that they have held in the past, and may select a number of parameters for each such job. As particular examples, the user may indicate the industry in which each job occurred, the amount that the user was paid for the job, and may provide information (e.g., commonly performed activities, processes involved, and hard or soft skills) to identify what role that job filled at the particular organization so that the role may be normalized to a standardized organization for comparison with other job seekers. Alternatively or in addition, the user may enter information about their current job that permits that job be normalized and mapped to a standardized organization, so that the user may obtain further information on their current job. At box 306, the user's job or role is mapped to standardize roles as discussed above and below.

At box 308, the user is linked to other users based on a standardized role determined for the user. For example, referring to FIG. 1B, Nancy 128 and Bill 132 may be placed in a similar social circle, and posts (e.g., leading practices, professional advice, white papers, policies, and document templates) made by members of that circle may be made available to other members of that circle, such that the workers who have similar jobs can communicate easily with each other if they have questions or information to share.

At box 310, content is delivered to the user based on the user's standardized role. For example, posts from other users (which may include individuals or organizations) who have been assigned or mapped to the same standardized role may be shown to the user when the user implements a social networking feature. Alternatively, the user may request white papers, document templates, market data, benchmarks, professional advice, work flows, or best practice manuals for particular tasks that need to be completed by typical members who have the standardized role, and the system may return a list of such documents that is a sub-set of the system's overall document collection, and that has previously been classified as being relevant to the particular standardized role. The user may be presented with a list of such documents stored by the system, and may choose to download and print or otherwise review one of the documents or share with additional users.

In this manner, then, a user may readily register with a system, provide information about their work history and current work, and be joined to other users and information that is targeted to their current or future needs.

Figure 3B:
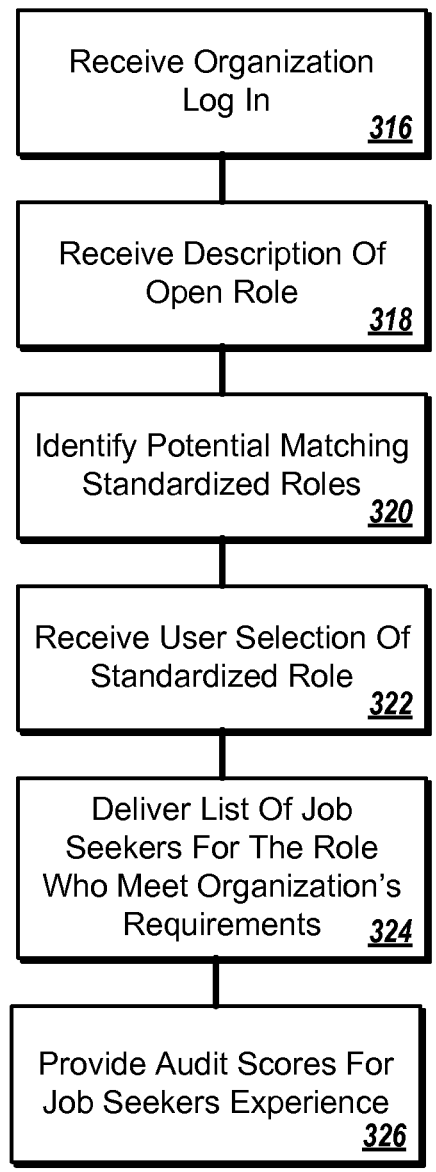
FIG. 3B is a flowchart of a process for providing job placement information to an organization seeking workers.

FIG. 3B is a flowchart of a process for providing job placement information to an organization seeking workers. In general, the process here is similar to the process described for FIG. 3A, but is directed to an organizational user, such as a human resource employee, as opposed to an individual user who is looking for their own information rather than information more broadly required by their job.

The process begins at box 316 where an organizational log in is received. Thus, for example, a human resource professional may have a personal login for the system, such as when they want to obtain particular information about their job integral to perform better, or to look for new jobs with the system. The same user may also have an organizational log in that they use only when performing human resources functions with the system.

At box 318, the system receives from the user a description of a job opening in an organization where the user is employed. For example, a supervisor with an organization may have contacted the human resources department to indicate that they would like to hire a new engineer. The human resources department may seek a description of the job openings from the supervisor, and the user (an employee of the human resources department) may then provide information from that description to the system, including by answering questionnaires provided by the system.

At box 320, the system identifies potential matching standardized roles for the job (e.g., by matching a user's description to a standardized roles, and then post a job under the identified section for the role, and also display the job to individuals who are in the working role for which a job opening has been identified, or that are at a level above or below that role). For example, answers that the user provided may be indeterminate with respect to where the job position fits in a standardized hierarchy for organization. Where there is such ambiguity, all of the positions that are deemed to match may be shown to the user, such as showing titles for the positions and short descriptions for the positions. The user may then select one of the displayed positions that best matches the position that the company is trying to fill. The user may also identify a title for the position within their company, so that it may be added to an organization chart for that company saved by the system, and may also be used to identify additional relationships in that chart, and to better map roles in that organizational chart to a standardized chart. At box 322, the process receives a user selection of the standardized role and makes such mapping to the chart for that organization and the standardized charts.

At box 324, the process delivers a list of job seekers for the role that meet the organization's requirements. For example, using a process like that discussed for FIG. 3A, a number of employees of various organizations may have previously identified themselves as seeking jobs with the system. Their answers to questions may have mapped their future role to the standardized role that the user selected in box 322, thus indicating that they may be proper candidates for the job opening.

At box 326, the process provides audit scores for the job seekers' experience to the user. In particular, the system may make determinations about the quality of each of the various job seekers who are shown to the user so that the user may more readily determine whether each of the jobseekers meets their needs. For example, a standardized job history may be presented that shows the progress of each job seeker over time, where standardized descriptions for their jobs are shown rather than the actual descriptions that they may have provided. In addition, the system may indicate whether its analysis of progression of each user shows that the user entered accurate data for their job history. For example, if the user showed mediocre progression for one period, and then exemplary progression for another, the system may indicate as much to the user and they may ask the job seeker about the discrepancy or identify whether the job seeker may be less than honest.

In addition, the system may compare and benchmark the progress of each particular jobseekers against others who are registered with the system and who provided their employment history information. For example, the system may be able to identify a particular speed with which employees typically move from one standardized position to another, and may present to the user information for each job seeker, indicating whether they were faster or slower that such progression.

Thus, in this manner, the standardization of job roles, and subsequent comparisons based on those standardizations) may be used to better present an employer with information about prospective candidates so that the employer does not have to individually make such determinations in an ad hoc manner. A system may also compare or benchmark educational background, hard or soft skills, recommendations and the like. Organizations that are looking to fill a job opening could also see all content and materials posted by each user that could potentially fill the opening (e.g., white papers, forum comments, and best practices).

Two particular detailed processes have been shown here that use standardization or normalization of organizational objects, and comparisons of the standardized data to corresponding data from objects in other organization. Using the same techniques discussed above, other functions may also be carried out, as follows: (a) a sales CRM tool managing information for salespeople on both individuals and organizations; (b) a standardized market data repository; (c) a homework helper-style document repository; (d) job compensation comparisons; (e) identification of standard job instructions and best practices; (f) a file sharing platform; (g) standardized tag-based search for documents, materials, users, and organizations; (h) software application searching; (i) software application collaboration and testing platform; and (j) individual performance benchmarking.

Figure 4:
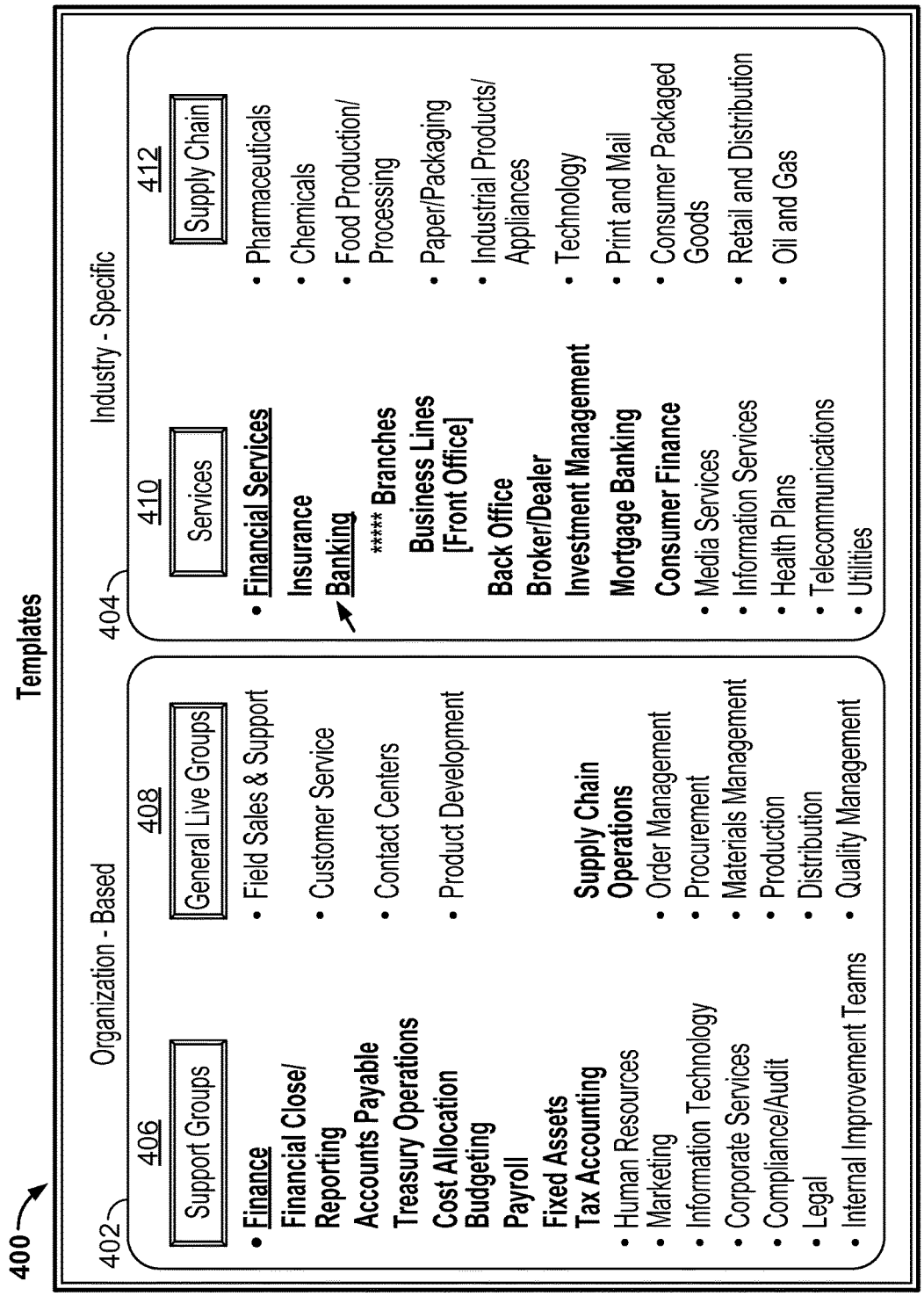
FIG. 4 shows example templates that may be made available and that relate to particular organizational functions.

FIG. 4 shows example templates that may be made available and that relate to particular organizational functions.

The templates take a variety of forms and may be used to describe various organizational objects in a standardized manner, so that particular attributes of those objects for particular organizations can be applied to the templates and then compared and manipulated in a predictable and repeatable manner.

There are two particular categories of templates in this example: organization-based templates that are organization by particular functions within an organization, and industry-specific templates that are organization by particular industry types. In each instance, as shown, the templates are arranged hierarchically, so that a user who is viewing a display of the templates, e.g., in a web browser, may select a link such as a link for the Finance department, and see sub-templates that apply to that department. As one example, a user can navigate to a landing page and choose "improvement" to be presented with a list of industries and common groups. The user can choose an industry or group that the user wants to improve or learn more about. The user can then be presented with multiple template choices such as a blank organizational chart, a benchmarking questionnaire, process maps, work flows, regulations and policies, a metric collection spreadsheet, and the like. The user can provide data, for example, to a benchmarking questionnaire template, and submit the data, and the system can produce a document with charts that compare the user's business using standard metrics.

Figure 5:
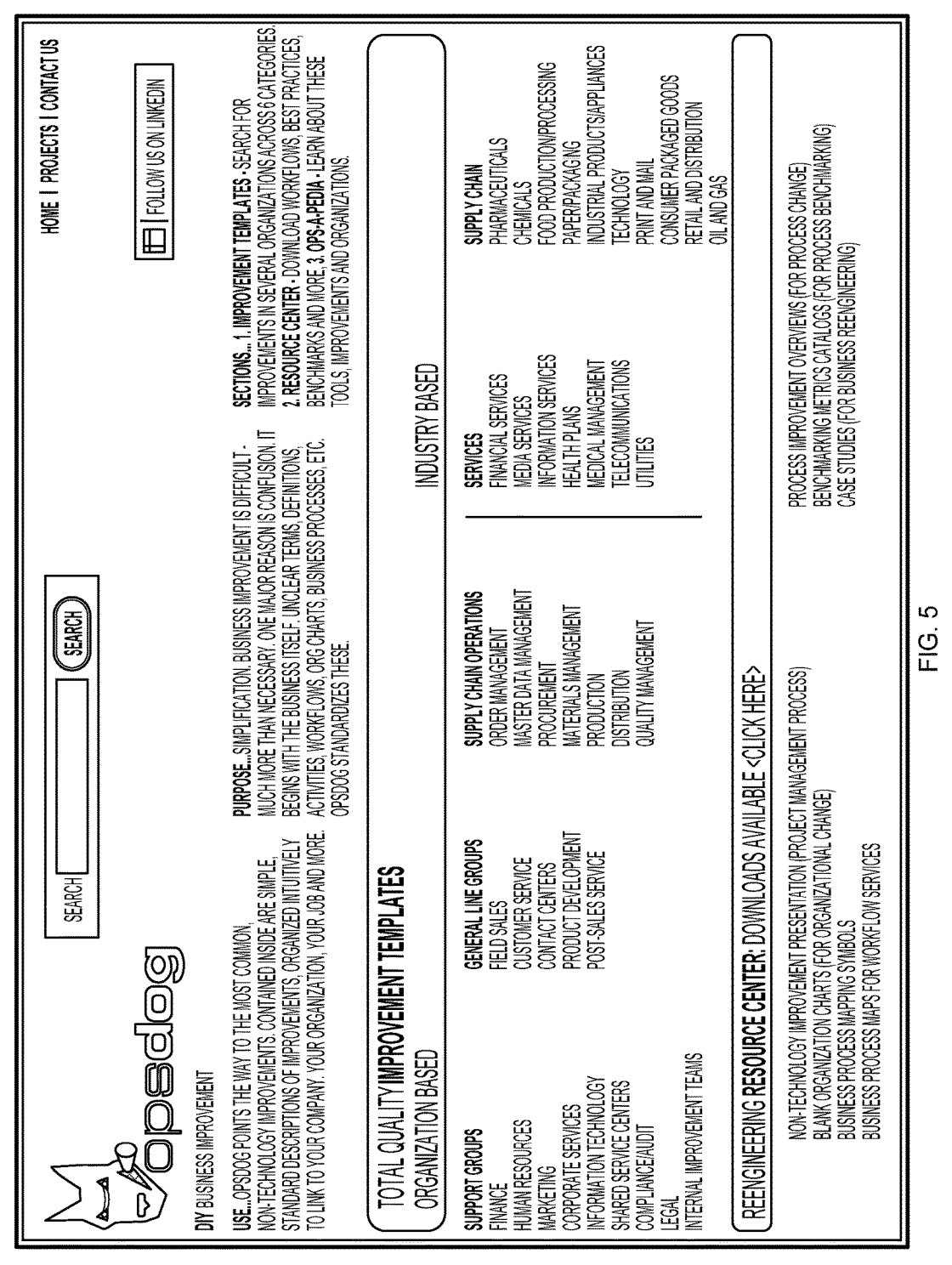

FIG. 5 is a screenshot of an interface that allows user to access information based on organization and industry-based structures. The interface is a web page by which user may access standardized content for managing an organization with which they are involved. The templates here are directed to total quality improvement processes, and can be filled out by a user and employed by the user's organization to improve quality and efficiency within the organization. The organization-based selection, like the similar selection in FIGS. 4 and 5, provides information on general organizational functions that are essentially similar across multiple industries and organizations. For example, companies in all industries have human resources, IT, and law departments.

In contrast, the industry-based selection reflects real-world organizational structures that go beyond general structures that are common across all industries. For example, the banking industry may have particular groups and process flows that are unique to loan processing or retail branch management collection, that are wholly different than those for a retail company. The presentation of selections in this manner, then, provides a user with an intuitive path for obtaining standardized information for their general needs and industry-specific needs, so that they can get the relevant information and get to it quickly with minimal hassle and hunting.

Figure 6:
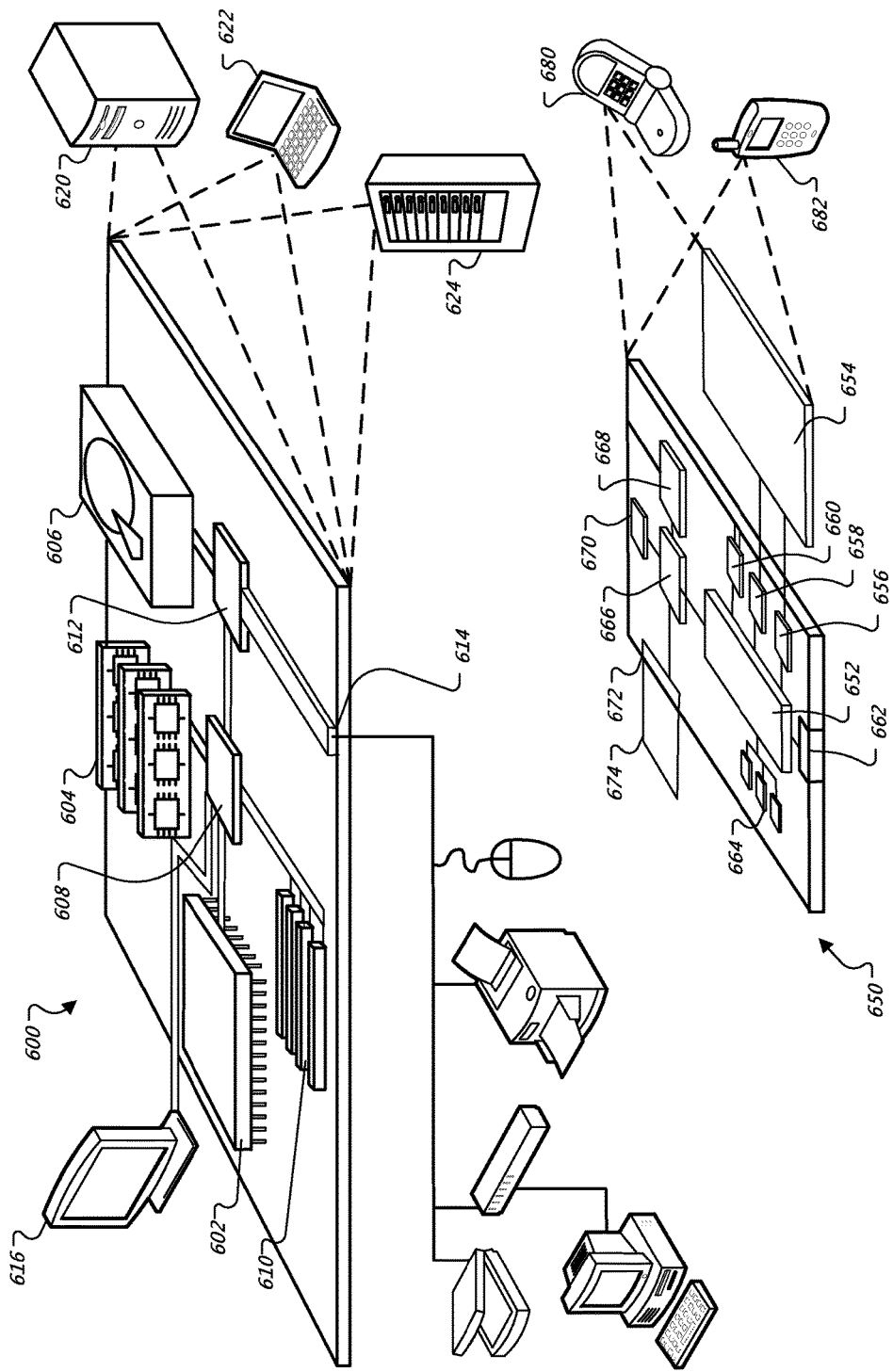
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. The device may be provided with a subscriber identity module (SIM) card that stores a key for identifying a subscriber with a telecommunications carrier to enable communication through the carrier. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular organization objects or items, but other forms of items may also be employed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for use in making comparisons between varying data across multiple separate businesses, the method comprising:
    receiving, at a server system and from a first user of a hosted computer service that is managed by the server system, first parameters that identify the first user's working role in an organization structure for a particular business in which the first user works;
    mapping, in storage on the server system, the first user's working role in the organization structure for the particular business to a normalized working role in a generalized business that is not a real operating business, by matching the first parameters to a template for the normalized working role, wherein the normalized working role corresponds to a position in a business structure that describes an organizational arrangement of the generalized business, and wherein the organizational arrangement of the generalized business is derived from organizational arrangements for multiple real operating businesses;
    receiving information from the first user that is about the first user, and associating the received information with the normalized working role;
    receiving a request for information from a second user of the hosted computer service, the request including second parameters;
    identifying that the second parameters match the normalized working role in the generalized business; and
    providing, for review by the second user, the information from the first user that was associated with the normalized working role, as a result of identifying that the second parameters match the normalized working role in the generalized business.

2. The computer-implemented method of claim 1, wherein the method further comprises
    receiving information that characterizes a working role of the second user,
    correlating the second user to a normalized working role in the generalized business using the received information; and
    associating the second user with one or more other users who have been correlated with the same normalized working role as the first user.

3. The computer-implemented method of claim 1, further comprising correlating one or more pieces of electronic content with a particular standardized organizational object, and automatically presenting, in response to a selection to review content by a user who is correlated to the organizational object, indicators for the one or more pieces of electronic content.

4. The computer-implemented method of claim 3, further comprising organizing, with the server system, the pieces of electronic content into multiple groups of electronic content, wherein each group of electronic content corresponds to one or more particular normalized working roles for the generalized organization, identified as having an interest in the group of electronic content.

5. The computer-implemented method of claim 4, wherein the organizational object is selected from a group consisting of an employee role, an organization, a sub-organization, a business process, a business activity, a business benchmark, a business responsibility, a best practice, a white paper, a blog post, a forum category, standard market data, a user group, a regulatory or compliance rule, an investor valuation, and a technology development specification.

6. The computer-implemented method of claim 1, further comprising identifying normalized working roles for a plurality of users of the server system, the normalized working roles representing representations of roles in the generalized business, and forming social connections between particular ones of the plurality of users based at least on the identified normalized working roles identified for each of the users.

7. The computer-implemented method of claim 1, wherein receiving the request from the second user comprises receiving an identification of a normalized working role, and providing for display to the second user a list of users who are each individually correlated to the normalized working role.

8. The computer-implemented method of claim 7, wherein receiving the identification of the normalized working role comprises:
(a) receiving an actual job title for the first user;
(b) providing for review by the first user a list of multiple normalized working roles that are determined by the server system to be potential matches for the actual job title; and
(c) receiving information from a selection by the first user of one of the provided normalized working roles.

9. The computer-implemented method of claim 7, wherein receiving the identification of the normalized working role comprises:
(a) providing, for review by the first user, data for generating a visual standardized organizational chart for an industry represented by the generalized business and;
(b) receiving information generated from a first user selection of one of the provided normalized working roles in the standardized organizational chart.

10. The computer-implemented method of claim 1, wherein providing the information from the first user comprises providing information indicating prior presence of the first user at various standardized working roles during a career of the first user.

11. The computer-implemented method of claim 1, further comprising correlating the first user to a plurality of different normalized working roles that each represent a job of the first user over a time period.

12. The computer-implemented method of claim 1, wherein the second user is the same as the first user.

13. A computer-implemented system, including one or more tangible storage devices, for making comparisons between varying data across multiple organizations, the system comprising:
a front-end, executable by one or more computer processors in communication with the one or more tangible storage devices, arranged to communicate through internet and to authenticate users registered with the system;
an organization matching engine for execution on the one or more computer processors and programmed to map a first user's working role in a first business organization that employs the first user, to a normalized organizational role that represents a normalized version of one or more actual organizational roles, by mapping a position in the first business organization, to a position in a different, standardized organizational structure that represents multiple different business organizations; and
a messaging module to, in cooperation with the organization matching engine, provide to a second user information submitted by the first user upon a determination by the system that parameters provided by the second user correspond to the normalized organizational role.

14. The computer-implemented system of claim 13, wherein the system is further programmed to:
receive information that characterizes a working role of the second user,
correlate the second user to a normalized working role using the received information; and
associate the second user with one or more other users who have been correlated with the same normalized working role as the first user.

15. The computer-implemented system of claim 13, wherein the organization matching engine is further programmed to correlate one or more pieces of electronic content with a particular normalized organization role, and the system is programmed to automatically present, in response to a selection to review content by a user who is correlated to the normalized organization role, indicators for the one or more pieces of the electronic content.

16. The computer-implemented system of claim 15, wherein the pieces of the electronic content are organized into multiple groups of electronic content, wherein each group of electronic content corresponds to one or more particular normalized working roles for an organization, which are identified as having an interest in the group of electronic content.

17. The computer-implemented system of claim 13, wherein the server system is further programmed to
identify normalized working roles for a plurality of users, the normalized working roles not being equated with actual working roles of the plurality of users, and
form social connections between particular ones of the plurality of users based at least on the identified normalized working roles identified for each of the plurality of users.

18. The computer-implemented method of claim 13, wherein receiving the request from the second user comprises receiving an identification of a normalized working role, and providing for display to the second user a list of users who are correlated to the identified normalized working role.

19. The computer-implemented method of claim 13, wherein the system is programmed to correlate the first user to a plurality of different normalized working roles that each represent a job of the user over a time period.

* * * * *

UNITED STATES PATENT AND TRADEMARK OFFICE
CERTIFICATE OF CORRECTION

PATENT NO. : 10,346,444 B1
APPLICATION NO. : 13/348857
DATED : July 9, 2019
INVENTOR(S) : William F. Heitman and Philip S. Spencer Page 1 of 1

It is certified that error appears in the above-identified patent and that said Letters Patent is hereby corrected as shown below:

In the Claims

Column 22, Line 34:
Claim 3, after "particular" delete "standardized".

Signed and Sealed this
Tenth Day of September, 2019

Andrei Iancu
*Director of the United States Patent and Trademark Office*